United States Patent
Ho et al.

(10) Patent No.: US 6,607,831 B2
(45) Date of Patent: Aug. 19, 2003

(54) MULTI-LAYER ARTICLE

(75) Inventors: Charlie Chia-Tie Ho, Woodbury, MN (US); Clarence Fullbright, Jr., Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/750,263

(22) Filed: Dec. 28, 2000

(65) Prior Publication Data
US 2002/0146568 A1 Oct. 10, 2002

(51) Int. Cl.[7] ............................................. B32B 27/40
(52) U.S. Cl. .................. 428/423.1; 428/423.3; 428/424.2; 428/424.4; 428/424.6; 428/424.8; 525/457; 427/393.5
(58) Field of Search ................. 428/423.3, 424.4, 428/423.1, 424.8, 424.6, 424.2; 525/457; 427/393.5

(56) References Cited

U.S. PATENT DOCUMENTS

| | | | |
|---|---|---|---|
| 4,311,547 A | 1/1982 | Biggs et al. ............ 156/244.13 |
| 4,337,296 A | 6/1982 | Varadhachary ............. 428/420 |
| 4,364,786 A | 12/1982 | Smith, Jr. et al. ............. 156/99 |
| 4,414,316 A | 11/1983 | Conley ....................... 430/496 |
| 4,436,774 A | 3/1984 | Biggs et al. ................... 427/40 |
| 4,719,132 A | 1/1988 | Porter, Jr. ................... 427/409 |
| 4,810,540 A | 3/1989 | Ellison et al. ................. 428/31 |
| 4,818,589 A | 4/1989 | Johnson et al. ............. 428/201 |
| 4,916,020 A | 4/1990 | Golding et al. ............. 428/421 |
| 4,933,237 A | 6/1990 | Krenceski et al. ........ 428/423.7 |
| 4,948,672 A | 8/1990 | Cartier ..................... 428/424.4 |
| 5,017,664 A | * 5/1991 | Grasel et al. ................ 525/454 |
| 5,034,269 A | 7/1991 | Wheeler .................. 428/317.3 |
| 5,034,275 A | 7/1991 | Pearson et al. ............. 428/336 |
| 5,514,427 A | 5/1996 | Ellison et al. ................. 428/31 |
| 5,648,425 A | * 7/1997 | Everaerts et al. ........... 515/100 |

FOREIGN PATENT DOCUMENTS

| | | | |
|---|---|---|---|
| EP | 0 304 187 | 2/1989 | |
| EP | 0 393 007 | 10/1990 | |
| EP | 0 611 146 | 8/1994 | |
| EP | 0 392 847 B1 | 7/1995 | |
| EP | 0 702 630 B1 | 8/1997 | |
| WO | WO89/04218 | 10/1988 | |
| WO | WO 93/10167 | 5/1993 | ........... C08G/59/00 |
| WO | WO94/03337 | 2/1994 | |

* cited by examiner

*Primary Examiner*—James J. Seidleck
*Assistant Examiner*—Melanie Bissett
(74) *Attorney, Agent, or Firm*—Jean A. Lown

(57) ABSTRACT

A multi-layered article comprising a first layer of a thermoset polyurethane. A second layer of a polymeric composition is bonded to the first layer. The polyurethane has available isocyanate groups prior to the application of the second layer. The second layer is applied onto the first layer in a pre-polymeric or polymeric state wherein the material has carboxyl groups and a cross-linking agent.

31 Claims, 3 Drawing Sheets

MULTI-LAYER ARTICLE

FIELD OF THE INVENTION

The invention relates to a multi-layered article, more particularly to a multi-layered article having a thermoset polyurethane layer bonded to a second polymeric layer and a method for making a multi-layered article.

BACKGROUND OF THE INVENTION

Thermoset poyurethane layers are desirable for use as protective layers on substrates. Conventional polyurethanes function well when they are utilized as laminates or coatings that are not subjected to subsequent process steps that require deformation of stretching of a cured thermoset polyurethane.

Thermoset polyurethanes are durable and can provide desirable aesthetic value to certain substrates. However, it often desirable to utilize polyurethane coatings on three dimensional articles. Conventional thermoset polyurethanes are generally rigid and have limited elongation properties. The limited elongation creates problems when attempting to thermoform polyurethanes in conventional molding applications. Additionally, the thermoforming of polyurethanes requires the use of elevated temperatures to enable the elongation of the polyurethane. The elevated temperatures can create both mechanical and aesthetic problems with the polyurethane. Additionally, elevated temperatures can adversely affect the gloss of the exposed surface of the polyurethane because of the direct contact of the exposed surface with the mold surface.

Other potential problems with conventional thermoset polyurethanes are created by the coating environment during the formation of the polyurethane coating. The process of forming the polyurethane coating on the substrate often takes place in an open environment. This can create surface defects such as bubbles, dust, dirt, etc. in the exposed surface of the polyurethane.

There is a need in the art for a thermoset polyurethane that is capable of greater elongation to enable improved thermoforming processes. Additionally, there is a need for a thermoset polyurethane that is capable of extensive thermoforming without adversely affecting the aesthetic properties of the finished polyurethane.

SUMMARY OF THE INVENTION

The present invention provides a multi-layered article that can function as a coating when applied onto various elements or substrates. The multi-layered article possesses physical characteristics that enable the use of the inventive article as either a protective or aesthetic coating on laminates or thermoformed articles.

The multi-layer article comprises a first layer of a thermoset polyurethane. A second layer of a polymeric composition is bonded to the first layer. The polyurethane has available isocyanate groups prior to the application of the second layer. The second layer is applied onto the first layer in a pre-polymeric or polymeric state wherein the material has carboxyl groups and a cross-linking agent.

The polyurethane is generally a two part thermosettable polyurethane having a hydroxyl component and an isocyanate component. The thermosettable polyurethane has available isocyanate prior to the application of the pre-polymeric or polymeric second layer. The term available isocyanate groups means that the thermosettable polyurethane possesses at least some amount of isocyanate that has not reacted with the hydroxyl component in the polyurethane. Therefore, the available isocyanate has the ability to react with components in the second pre-polymeric or polymeric layer. Available isocyanate groups in the polyurethane can be obtained in various manners. For example, partial curing of the thermoset polyurethane or the use of excess isocyanate in the polyurethane can result in available isocyanate.

The second layer is a pre-polymeric or polymeric material having carboxyl groups and a cross-linking agent. The cross-linking agent can react with the available isocyanate (NCO) groups of the polyurethane and also react with the carboxyl groups in the second layer. The reaction of the cross-linking agent with components in each layer can enhance the bond between the layers.

In an alternative embodiment, the present inventive article includes available hydroxyl or amine groups in the polymeric and pre-polymeric layer. The available hydroxyl groups or amine groups either replace or supplement the carboxyl groups and cross-linking agent. The available hydroxyl groups or amine groups are capable of reacting with the isocyanate groups of the first layer of a thermosettable polyurethane.

The resulting multi-layered article exhibits an improved elongation over conventional thermoset polyurethanes. The article of the present invention has an elongation test result of at least 15% at 25° C. The improved elongation permits thermoforming of the article at temperatures of 100° C. or less.

In a preferred embodiment, the thermoset polyurethane is produced utilizing a primary isocyanate. The resulting multi-layered article has a urethane linkage as indicated by FTIR test results at 25° C., taken from either the first or second layer surface. The urethane linkage exhibits the unique property of having a hydrogen bonded carbonyl peak equal to or smaller than a free carbonyl peak.

The invention also provides for a method of producing a multi-layer article by coating a thermosettable polyurethane composition, optionally, partially curing to form a layer of polyurethane having free isocyanate (NCO) groups, and coating a polymeric composition having carboxylic groups and a cross-linking agent on top of the first layer.

For purposes of the present invention, the following terms used in this application are defined as follows:

"hydroxyl component" means one or more diols, one or more polyols, or mixtures thereof;

"isocyanate component" means one or more diisocyanates, one or more polyisocyanates, or mixtures thereof;

"polyol" means a compound having a hydroxyl (OH) functionality of three or more;

"diol" means a compound having a hydroxyl functionality of two;

"diisocyanate" means a compound having an isocyanate (NCO) functionality of two;

"Polyisocyanate" means a compound having an isocyanate (NCO) functionality of three or more;

"primary isocyanate" means a carbon atom upon which the isocyanate group is attached to also has two hydrogen atoms;

"catalyst" means a material that can change the speed of a chemical reaction;

"polymerize" or "cure" means to alter the physical state and or chemical state of the composition, to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"partially cured" polyurethane means a polyurethane having available isocyanate groups within the polyurethane that are capable of further reaction with active hydrogen containing materials, for example, hydroxyl groups, amine groups, etc.;

"thermosettable polyurethane" means a polyurethane having available isocyanate groups for further reaction with hydroxyl groups; and "polymeric" means a composition having less than 5% by weight monomers excluding the cross-linking agent;

"pre-polymeric" means a monomeric or oligomeric composition or mixtures thereof, or a blend of polymeric and monomeric or oligomeric compositions;

"equivalent weight" of the hydroxyl components corresponds to the molecular weight of the material divided by the number of hydroxyl functionalities.

Other features and advantages will be apparent from the following description of the preferred embodiments thereof, and from the claims.

BRIEF DESCRIPTION OF THE DRAWING

The advantages of the present invention will become readily apparent to those skilled in the art from the following detailed description when considered in the light of the accompanying drawings in which.

DETAILED DESCRIPTION

The invention relates to a multi-layer article having at least a first layer of a thermoset polyurethane that is bonded to a second layer of a polymeric composition. The article may take various forms including a sheet, a decorative article, a three-dimensional article, a graphic and the like. For simplicity, the embodiments will be described in sheet form but it is understood that the sheet may be die-cut, vacuum thermoformed, embossed, debossed, or otherwise formed into an article.

Figure 1:
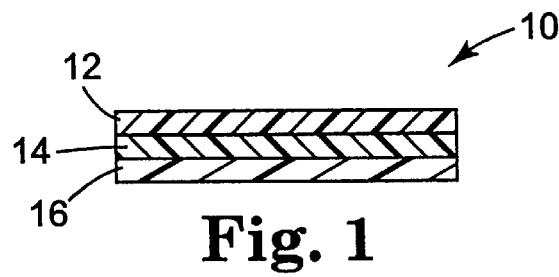
FIGS. 1–4 are cross-sectional views of articles produced using the multi-layered article of the present invention.
Figure 2:
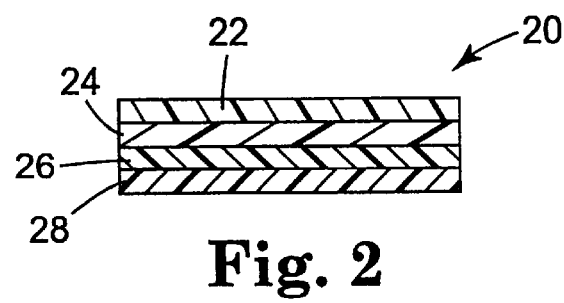
Figure 3:
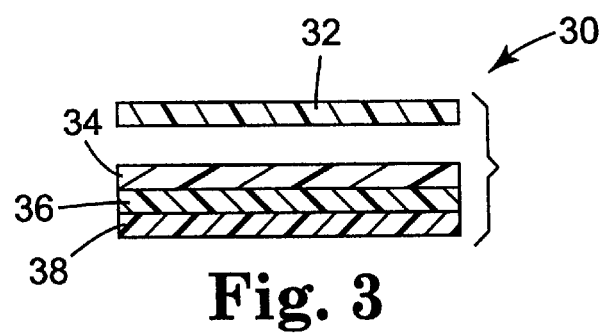
Figure 4:
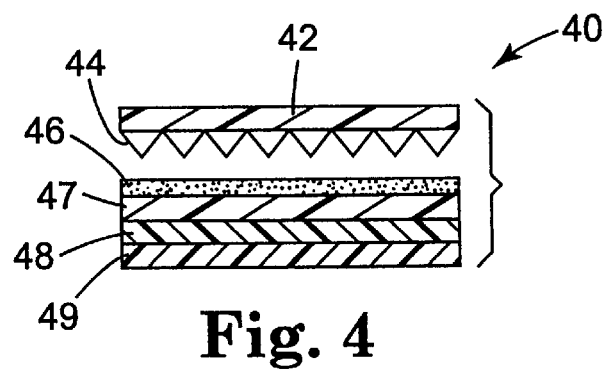

FIG. 1 illustrates one embodiment of the invention. Article 10 includes thermoset polyurethane first layer 14 on a biaxially oriented poly(ethylene terephthalate) film 12 having a polyacrylic release coating (not shown). A second layer 16 is a polymer having a different composition than the first layer and is bonded to the first layer. For purposes of the present invention, the poly(ethylene terephthalate) film 12 is utilized as a carrier film during manufacturing of the multi-layered article. The oriented poly(ethylene terephthalate) film 12 is generally stripped away prior to end use applications of layers 14 and 16 of the article 10. FIGS. 2–4 illustrate various articles incorporating the multi-layered article of the present invention. FIGS. 2–4 are discussed in detail below.

Materials

The thermoset polyurethane layer of the invention is the reaction product of a hydroxyl (OH) component and an isocyanate component (NCO). The hydroxyl component comprises one or more diols, one or more polyols, or a combination of diols and polyols. The isocyanate component can comprise one or more diisocyanates, one or more polyisocyanates, or mixtures thereof. The hydroxyl component and the isocyanate component can be either solventless, also referred to as 100 percent solids, or solvent based. As used herein the term solventless may include up to about 5% by weight of a solvent, water or both. The term polyol as used herein includes triols, as well as other polyols useful in forming polyurethane materials. The hydroxyl component and the isocyanate component are provided as two-part compositions with a hydroxyl component comprising one part and the isocyanate component comprising the second part.

In accordance with the present invention, suitable diols and polyols include polyester compositions, polyacrylic compositions, polyether compositions, polycarbonate compositions, polyalkylene compositions, carbinol terminated polydimethylsiloxane and mixtures thereof. Typical equivalent weights of diols or polyols useful for the present invention are generally in the range of about 28 to about 3000. However, other diols and polyols having equivalent weights outside of the noted range may be suitable for use in the present invention. Suitable diols and polyols are commercially available under various sources. Sources (and their respective tradenames) include, but are not limited to Bayer Corporation of Pittsburgh, Pa. (Desmophen™ and Multranol™), Crompton Corporation of Greenwich, Conn. (Formrez™) Union Carbide of Danbury, Conn. (Tone™), S. C. Johnson Polymers of Racine, Wis. (Joncryl™), Rohm & Haas of Philadelpjia, Pa. (Acryloid™), Ruco Polymers of Hicksville, N.Y. (Rucoflex™), Solvey Interox of Houston, Tex. (Capa™), BASF of Mount Olive, N.J. (Pluracol™) and Dupont Company of Wilmington, Del. (Terathane™).

The hydroxyl (OH) groups of the hydroxyl component react with the NCO groups of the isocyanate component, preferably in the presence of a suitable catalyst, to form a thermoset polyurethane. Suitable isocyanates may be aliphatic or aromatic, and may be primary, secondary, tertiary, or a mixture thereof. In a preferred embodiment, the isocyanate component is a polyisocyanate, or trifunctional isocyanate, to improve durability of the resulting polyurethane. For articles which require outdoor weatherability, aliphatic polyisocyanates are preferred. For a flexible sheet material to be used for vacuum thermoforming into three dimensional articles, the polyisocyanate is preferably a primary polyisocyanate such as a biuret or a isocyanurate. Primary polyisocyanates are generally made from primary diisocyanates. Examples of primary diisocyanates that are suitable for producing primary polyisocyanates include, but are not limited to, 1,6-hexamethylene diisocyanate, trimethyl-hexamethylene diisocyanate, 1,4-tetramethylene diisoycanate, 1,3-xylene diisocyanate, 1,4-xylene diisocyanate, 1,12-dodecamethylene diisocyanate, 2-methylpentamethylene diisocyanate, or 1,4-cyclohexane dimethylene diisocyanate.

The present invention utilizes available isocyanate groups in the thermosettable polyurethane to form a beneficial bond between the cured thermoset polyurethane and a polymeric layer. The available isocyanate groups in the thermosettable polyurethane are present in the polyurethane prior to applying the prepolymeric or polymeric composition to an exposed surface of the thermosettable polyurethane. Available isocyanate groups are obtained in the thermosettable polyurethane under various practices. For example, in one preferred embodiment the two part polyurethane can be formulated utilizing an excess of isocyanate groups. The resulting thermosettable polyurethane, prior to applying the second layer of prepolymeric or polymeric material would have unreacted isocyanate groups available, preferably at the surface at which the second layer will be applied. In this particular embodiment, the NCO to OH ratio would be greater than one. In another preferred embodiment, the thermosettable polyurethane is partially cured. The partial curing of the thermosettable polyurethane would provide available isocyanate groups at the surface of the thermosettable polyurethane upon which the second layer will be provided.

The components of the two part polyurethane may be selected to achieve different physical properties in the resulting thermoset polyurethane. Those skilled in the art are capable of selecting specific isocyanates, diols and polyols to obtain desired properties for specific end uses of the multi-layered article of the present invention.

In accordance with the present invention, the ratio of isocyanate (NCO) groups to hydroxyl (OH) groups is preferably in the range of 0.75 to about 1.25. The range can be selected to achieve desired finished properties in the thermoset polyurethane. For example, a higher amount of polyol may result in a more flexible article while a higher amount of polyisocyanate can form a stiffer or harder article. Additionally, the ratio of isocyanate (NCO) groups to hydroxyl (OH) groups may be adjusted to provide available isocyanate groups in a thermosettable polyurethane. Those skilled in the art are capable of selecting specific ratios to achieve the desired available isocyanate groups.

The present invention preferably includes a catalyst in combination with the hydroxyl component and the isocyanate component in order to facilitate the reaction between the components. Conventional catalysts generally recognized for use in the polymerization of polyurethanes are suitable for use with the present invention. For example, aluminum, bismuth, tin, vanadium, zinc, zirconium based catalysts, or mixtures thereof may be used. Although not desired because of the their potential toxicity, mercury based catalysts may also be used. The preferred catalysts are tin based catalyst with most preferred being dibutyl tin compounds. Even more preferable are the catalysts selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. The catalyst is preferably included at levels of at least 10 parts per million parts (ppm) based on the total solution weight in the first component, and more preferably at least 25 ppm or greater.

The present invention includes a second layer of a prepolymeric or polymeric material bonded to the thermosettable polyurethane layer in order to form the multi-layered article. The second layer comprises the reaction product of a composition having carboxyl groups and a crosslinking agent. The crosslinking agent is reactive with both the carboxyl groups of the pre-polymeric or polymeric composition and the available isocyanate groups of the thermosettable polyurethane. The polymeric or prepolymeric compositions may be water-based, solvent based, or 100% solids.

The second layer can function as a primer layer to which other materials may be adhered. It may also be an adhesive, e.g., a pressure-sensitive adhesive, that may be laminated onto the partially cured polyurethane surface, or it may be coated onto the partially cured polyurethane surface as a solution, e.g., a monomeric solution or partially polymerized syrup, and cured. A suitable pressure-sensitive adhesive layer can be made according to U.S. Pat. No. 4,181,752 (Martens et al.), incorporated in its entirety herein by reference.

Suitable polymeric or prepolymeric compositions include those having available carboxylic acid groups and include, but are not limited to, polyurethanes, polyurethane/acrylic copolymers, copolymers or terpolymers of polyalkylene, polyalkyl diene, polyacrylate ester, polyalkyl ester, polyvinyl ester, or polyvinyl with acrylic acid or methacylic acid. Examples of copolymers are polyethylene acrylic acid copolymer, polyethylene methacrylic acid copolymer, polyethylene acrylic methacrylic acid terpolymer, methylmethacrylate-acrylic acid copolymer, polybutadiene methacrylic acid copolymer, vinylchloride-acrylic acid copolymer, and mixtures thereof. The preferred polymers and copolymers are polyurethanes, polyethylene acrylic acid copolymers and polyethylene methacrylic acid copolymers. The properties of the resulting polymer can be adjusted by varying the number of carboxyl groups. Those skilled in the art recognize that the available carboxylic acid groups can be adjusted by adjusting the acid number of the selected prepolymeric or polymeric composition.

The present invention utilizes cross-linking compounds in the pre-polymeric or polymeric compositions. Cross-linking compounds suitable for the composition for the second layer are preferably multi-functional compounds. Multi-functional means that the compounds comprise a functionality of two or greater and can preferably react with both the carboxyl groups of the second layer and the isocyanate groups of the first layer. Useful cross-linkers include, but are not limited to, polyfunctional aziridines, multifunctional carbodiimides, multifunctional epoxies, and melamine resins. The preferred cross-linkers are polyfunctional aziridines, e.g., trimethyl propane-tris-(B-(N-aziridinyl)propionate, pentaerythritol-tris-(B-(aziridinyl)propionate, and 2-methyl-2-ethyl-2-((3-(2-methyl-1-aziridinyl)-1-oxopropoxy)methyl)-1,3-propandiyl ester.

In an alternative embodiment, the present inventive article includes available hydroxyl or amine groups in the polymeric and prepolymeric layer. The available hydroxyl groups or amine groups either replace or supplement the carboxyl groups and cross-linking agent. The available hydroxyl groups or amine groups are capable of reacting with the isocyanate groups of the first layer of a thermosettable polyurethane.

Other additives may be included in the compositions of either the first or second layer of the multi-layered article. Preferably, additives are included to enhance processing of the materials or modify properties of the respective layers. For example, leveling agents or flow control agents may be utilized to ensure a smooth coating. Examples of leveling agents include polyalkylene oxide modified polymethyl siloxane, polyalkylene oxide modified nonyl phenol, cellulose acetate butyrate, alkyl sodium succinate, and acrylate copolymers or terpolymers. Other leveling agents generally recognized by one of ordinary skill in the art may also be suitable for use with the invention. The leveling agents are typically included in the range from about 0.01 weight percent to about 4 weight percent.

Either or both layers can include UV absorbers which improve the weather resistance. The UV absorbers generally recognized in the art may be suitable for use with the invention. Alternatively, a hindered amine radical scavenger can be included or combined with an UV absorber. The hindered amine free radical scavengers generally recognized in the art contribute to photostabilization of the polyurethane by trapping alkoxy and hydroxy radicals produced by light-induced dissociation of hydroperoxides. The amount of UV absorber in the polyol composition is typically in the range from about 0.1 weight percent to about 4 weight percent. The amount of hindered amine radical scavenger in the first component is typically in the range of about 0.1 weight percent to about 3 weight percent.

Additionally, moisture scavengers, antioxidants, fungicide, and antifoaming agents can be included with the compositions of either layer. Conventional compounds of the noted categories generally recognized by those skilled in the art may be suitable for use in the present invention to improve the finished properties. Moisture scavengers may be included at levels in the range of about 0.1 weight percent to about 3 weight percent. The antioxidant is desirably included in a range of about 0.1 weight percent to about 2 weight percent. Antifoaming agents and fungicides are typically included in an amount from about 1.0 weight percent or less.

Other materials, such as coloring agents and decorative solids, can be added to the compositions of either layer to enhance the aesthetics of the finished article. Decorative solids could include such items as metal flakes, polymeric flakes, glitter, beads, or other materials that provide a decorative feature to the finished article. Coloring agents, such as pigments or dyes, and decorative solids are included at various levels to obtain a desired effect in the finished article.

Additionally, a solvent may be added to the compositions of either layer to provide a suitable viscosity for coating, enhance dispersibility of other material, or otherwise aid in the processing of the compositions. Suitable solvents include water, methyl ethyl ketone, methyl isobutyl ketone, butyl acetate, xylene, glycol ethers such as propylene glycol monomethylether acetate, diethylene glycol ethylether acetate, as well as blends and mixtures thereof.

Method

In the practice of the method of the present invention, a first layer of a thermosettable polyurethane is formed. The formation of the layer may be accomplished by conventional practices such as, for example, coated or extruded onto a carrier web. Those skilled in the art are capable of coating or extruding the polyurethane of the present invention onto a carrier web using known techniques.

The thermosettable polyurethane, prior to coating or extrusion onto a web, is prepared by first mixing the hydroxyl component with a suitable solvent if needed, and any optional additives. The isocyanate component, and any solvent or optional additives, is prepared utilizing conventional practices. The two compositions are then mixed in appropriate amounts to obtain the desired NCO:OH ratio. The NCO:OH ratio is preferably selected between 0.75 and 1.25. The composition is then coated onto a releasable carrier. Suitable carriers that may be used include films such as biaxially oriented polyester and papers that may be coated or printed with a composition that will enable release from thermoset polyurethane compositions. Such coatings include those formed from polyacrylics, silicone, and fluorochemicals.

The mixture of the hydroxyl component and isocyanate component can be coated onto a carrier web using conventional equipment known by those skilled in the art such as knife coater, roll coaters, reverse roll coaters, notched bar coaters, curtain coaters, rotogravure coaters, rotary printer and the like. The viscosity of the composition is adjusted to the type of coater used.

The coated composition is then dried and in one embodiment partially cured at elevated temperatures. An increasing temperature profile is preferably used to first evaporate the solvent and then partially cure the composition to a polyurethane having detectable available isocyanate (NCO) groups as determined by Fourier Transform Infrared (FTIR) as described below. A typical temperature profile for a 0.003 inch thick wet coating having a solids content of about 45% may be 1.5 minutes at 80° C., 1.5 minutes at 105° C. and 1.5 minutes at 125° C. The temperature and time should be sufficiently high to cure the composition to a film, but sufficiently low to leave available isocyanate (NCO) groups to bond to the second layer. Preferably, there are at least about 1% of the isocyanate (NCO) groups available during the coating of the second layer as determined by FTIR, and more preferably between about 20 to about 90% of the isocyanate (NCO) groups available.

In an alternative embodiment, the mixture of hydroxyl components and isocyanate components is prepared at an NCO:OH ratio in excess of one. The specific ratio provides available isocyanate (NCO) for reaction with the second layer of prepolymeric or polymeric material even when the hydroxyl component of the polyurethane mixture is exhausted. The thermosettable polyurethane is dried as in the previous embodiment.

A second layer of a prepolymeric or polymeric material is coated onto the thermosettable polyurethane layer having available isocyanate (NCO) groups. It is desirable to coat the second layer soon after providing a first layer with available isocyanate (NCO) groups. Preferably, the second layer is coated immediately after coating the first layer because the first layer can continue to cure at ambient temperature. The second layer contains carboxyl groups and a cross-linking agent. The cross-linking agent reacts with the available isocyanate (NCO) groups of the polyurethane and also reacts with the carboxyl groups in the second layer. The reaction of the cross-linking agent with components in each layer enhances the bond between the layers.

The resulting multi-layered article is then dried and cured at oven temperatures similar to those for the first layer. Preferably, the multi-layered article is dried at a temperature of about 25° C. to about 275° C. If one or both layers are not fully cured after an initial drying temperature, they can completely cure at room temperature after being stored.

The thickness of the thermoset polyurethane layer can vary as needed for the end use. Typically, the cured thickness is in the range of about 0.0025 millimeters to about 0.075 millimeters, preferably it is between about 0.0050 to about 0.05 millimeters.

The thickness of the second layer is also determined by the end use and the dry thickness is typically about 0.0025 millimeters to about 0.075 millimeters, and is preferably about 0.01 millimeters to about 0.05 millimeters.

Properties of the Resulting Article

The specific materials for the multi-layered article of the invention can be tailored to provide desired properties for the end use. The thermoset polyurethane layer provides a durable surface on the articles of the invention. This layer may also be formulated to have excellent outdoor weathering resistance as well as excellent scratch/mar resistance. For many uses such as graphic articles, it is preferred that the thermoset polyurethane layer is clear with high gloss, and it functions as a clear coat. However, it may also be tinted or opaque with controlled gloss.

The multi-layered article produced in accordance with the present invention is flexible and extensible. A conventional thermoset polyurethane that has been fully cross-linked before coating a second layer has a typical elongation at room temperature of less than about 8%. Additionally, a second layer applied onto a fully cured (indicating no available isocyanate) thermoset polyurethane layer does bond properly and will fail the adhesion test described below in the Examples Section. The present invention has an elongation of greater than about 15% at room temperature, preferably greater than about 25%, and more preferably greater than about 50%. It is believed that the elongation of the present invention permits the multi-layered article to be thermoformed at lower temperatures over prior art polyurethane based articles while maintaining excellent definition of the features of the mold.

Figure 5:
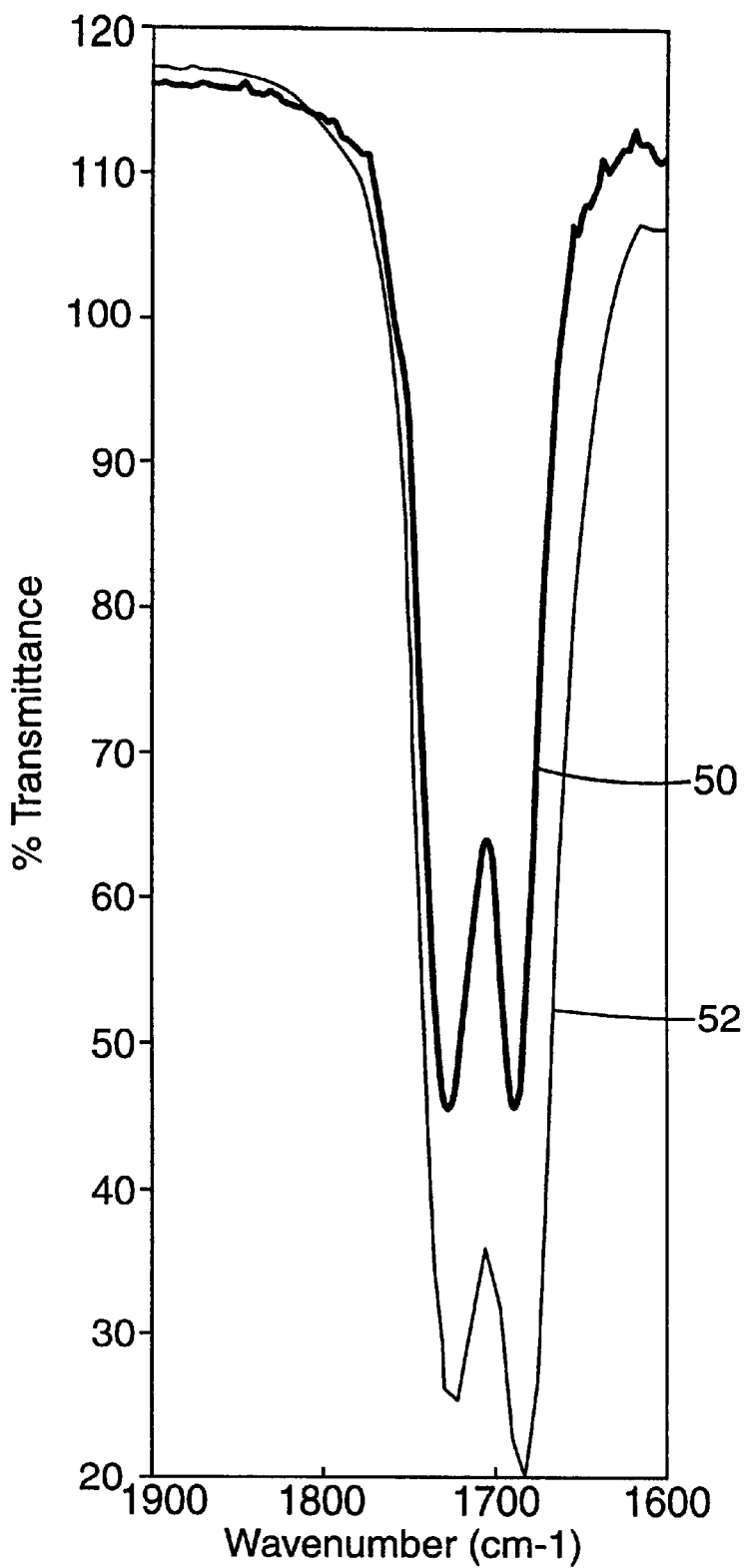
FIGS. 5 and 6 are graphs of FTIR test results comparing a multi-layered article according to the present invention to a conventional multi-layered article.
Figure 6:
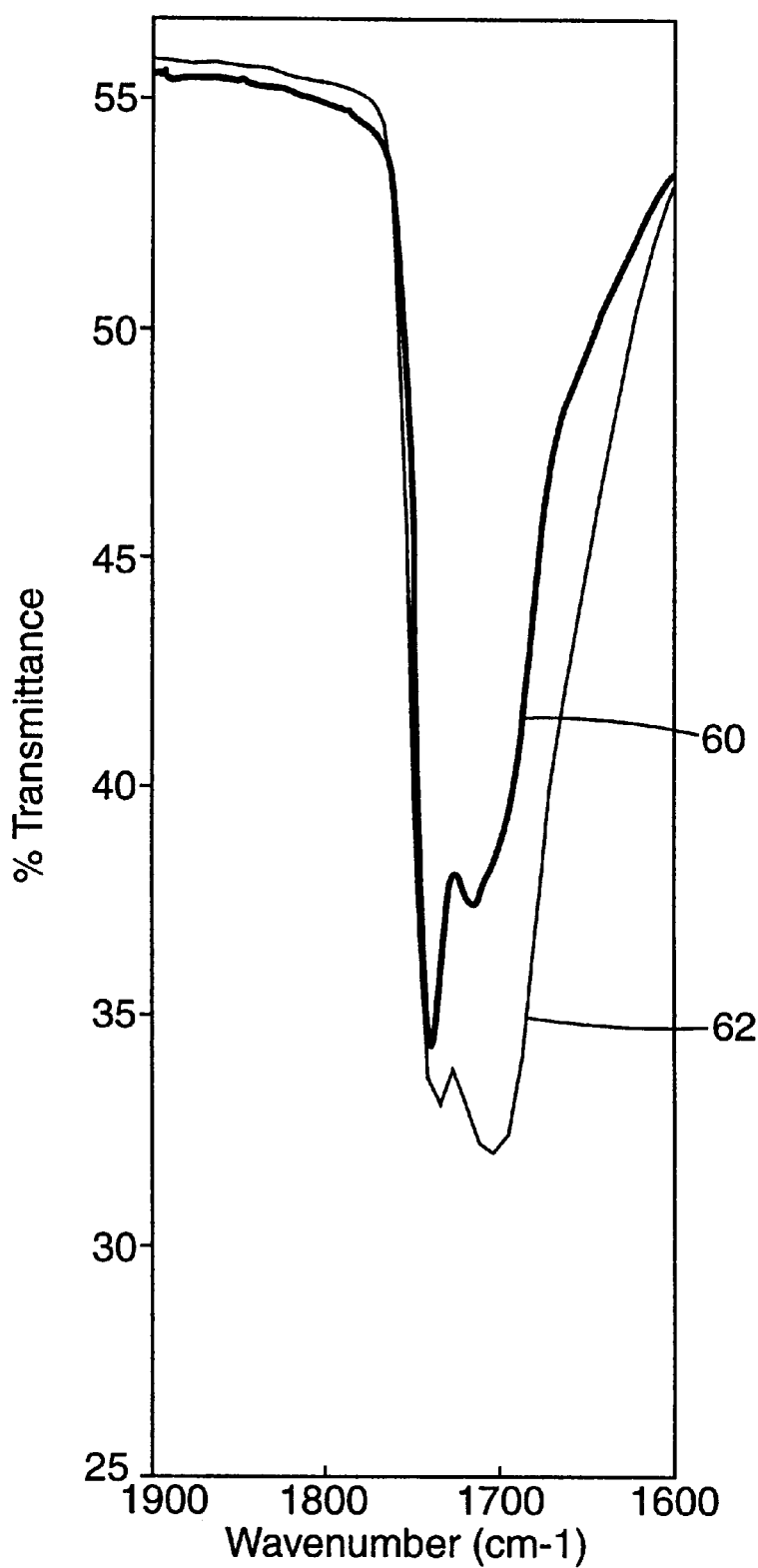

In a preferred embodiment utilizing a primary isocyanate in the thermoset polyurethane, the multi-layered article of the present invention exhibits greater flexibility over polyurethane based multi-layered articles utilizing conventional practices. The inventors believe that the hydrogen bonding interaction between polyurethane backbones are disrupted in the present invention which accounts for the increased flexibility over the prior art. The inventors, however, do not wish to limit the invention to just this possible explanation, and therefore, offer it merely as an aid to understanding the results of the present invention. This phenomenon is demonstrated in the FTIR spectrum. FIGS. 5 and 6 illustrate the difference in FTIR spectrum between the present invention and polyurethane based multi-layered articles made in conventional practices.

FIG. 5 is a comparison of two multi-layered articles having a layer of a thermoset polyurethane, utilizing a primary isocyanate, and second layer of a water based polyurethane. The FTIR transmittance result was measured from the thermoset polyurethane layer. Transmittance band 50 of FIG. 5 illustrates the FTIR result at 25° C. of a thermoset polyurethane of a multi-layered article produced according to the present invention and described in Example 1 discussed in the "Examples" section. Transmittance band 52 of FIG. 5 illustrates the FTIR result at 25° C. of a thermoset polyurethane of a multi-layered article produced according conventional practices and described in Comparative Example 1 detailed in the "Examples" section. In general, the carbonyl band of urethane linkage shows a doublet in an FTIR spectrum. One peak is located at about 1730 cm$^{-1}$ which is assigned to the non-hydrogen bonded carbonyl groups and the other one is located at about 1690 cm$^{-1}$ which is assigned to a hydrogen bonded carbonyl groups. In FIG. 5, transmittance band 50 illustrates a urethane linkage exhibiting a hydrogen bonded carbonyl peak at about 1690 cm$^{-1}$ equal to or smaller than a free carbonyl peak at about 1730 cm$^{-1}$. Transmittance band 52 indicates a doublet having a carbonyl peak smaller than the hydrogen bonded carbonyl peak.

FIG. 6 is a comparison of the same multi-layered articles of FIG. 5 with an FTIR transmittance result measured from the water based polyurethane and not the thermoset polyurethane as used in FIG. 5. Transmittance band 60 of FIG. 6 illustrates the FTIR result at 25° C. of a water based polyurethane of a multi-layered article produced according to the present invention and described in Example 1 detailed in the "Examples" section. Transmittance band 62 of FIG. 6 illustrates the FTIR result at 25° C. of a water based polyurethane of a multi-layered article produced according conventional practices as described in Comparative Example 1 discussed in the "Examples" section. In general, the carbonyl band of urethane linkage shows a doublet in an FTIR spectrum. One peak is located at about 1730 cm$^{-1}$ which is assigned to the non-hydrogen bonded carbonyl groups and the other one is located at about 1690 cm$^{-1}$ which is assigned to a hydrogen bonded carbonyl groups. In FIG. 6, transmittance band 60 illustrates a urethane linkage exhibiting a hydrogen bonded carbonyl peak at about 1690 cm$^{-1}$ smaller than a free carbonyl peak at about 1730 cm$^{-1}$. Transmittance band 62 indicates a doublet having a free carbonyl peak smaller than the hydrogen bonded carbonyl peak.

It is the inventors belief that when the hydrogen bonded carbonyl peak is equal to or greater than the non-hydrogen bonded peak, the urethane becomes more crystalline, stiffer and harder with higher modulus and less elongation. This may be attributed to the hydrogen bonding interactions acting as pseudo-crosslinking between polymer chains which strengthens the physical properties of the urethane. The preferred embodiments exhibit an FTIR spectrum that indicates that there is less hydrogen bonding in the carbonyl band. When there is less hydrogen bonding present in the urethane, the non-hydrogen bonded peak located at about 1730 cm$^{-1}$ is greater than the hydrogen peak located at about 1690 cm$^{-1}$ in FTIR spectrum. In this case, urethane becomes more amorphous and flexible with relatively greater elongation. The greater elongation is needed to enhance end use processing techniques such as vacuum thermoforming.

In addition to modifying the properties of the partially cured polyurethane layer, the second layer can act as a tie layer to provide a surface to which other materials and layers can be bonded.

Additional layers may be coated or laminated to either major surface of the article to form other articles of the invention. The layers can be continuous or discontinuous. These layers include, but are not limited to, extruded sheets, cast sheets, metal vapor coatings, printed graphics, adhesives, primers, and the like. The other layers are preferably attached to the second layer, but may also be attached to the surface of the first layer.

FIG. 2 illustrates an article 20 having a releasable polyester carrier 28, a first layer 26 of a thermoset polyurethane, a second layer 24 of a water based polyurethane layer, and a third layer 22 of a thermoplastic polyurethane layer extruded directly onto second layer 24.

In an alternative embodiment, article 30 of FIG. 3 has a releasable polyester carrier 38, a first layer 36 of a thermoset polyurethane, and a second layer 34 of a water based polyurethane layer. Third layer 32 of a thermoplastic polyurethane is extruded as a sheet, and then heat laminated onto second layer 34 in a separate step.

In another embodiment, a graphic article 40 of FIG. 4 has a releasable polyester carrier 49, a first layer 48 of a thermoset polyurethane, and a second layer 47 of a water based polyurethane layer. Third layer 46 is a pressure-sensitive adhesive coated on top of the second layer. A separate film 42 made of polyvinyl chloride and printed with graphics 44 is laminated to the pressure-sensitive adhesive layer 46.

The articles of the invention can be applied to many structures. The releasable carrier may be removed during a forming process such as vacuum thermoforming, or it may be removed from the article after the article has been applied to a permanent surface of a structure. The structures may be flat or have a compound, contoured surface in three dimensions. For application to these latter complex surfaces, the article needs to be sufficiently flexible to conform thereto without delaminating or lifting off. The actual requisite flexibility will depend in large part on the nature of the structure surface. Some common structures encountered in the automotive industry include bumper facia, pillar posts, rocker panels, wheel covers, door panels, trunk and hood lids, mirror housings, dashboards, floormats, door sills, etc. The article typically includes an adhesive layer which is conventionally protected by removable release liner if the adhesive is pressure-sensitive. The article is applied to the structure, preferably in a single continuous motion, by simultaneously removing the release liner and applying the article in a smooth, flat manner. The graphic article may be pressed flat to remove any entrapped air and to provide a good adhesive bond with the underlying substrate.

Graphic articles according to the invention be applied to automobiles, trucks, motorcycles, trains, airplanes, marine vehicles and snowmobiles. However, the invention is not limited to vehicular settings and may be used anywhere a multi-layer decorative, functional or informational graphic article is desirable, including both indoor and outdoor environments. If desired the invention may be used to provide colored retroreflective articles by forming a color layer on a retroreflective substrate.

For indoor uses, the thermoset polyurethane layer may be formulated to impart interior surface protection properties to the graphic article. As noted above, polyurethane-based materials comprising the reaction product of aromatic isocyanates and polyols are useful in this regard as are other materials. "Interior surface protection properties" means mar resistance and that the graphic article will not appreciably change in appearance or adhesion when subjected to interior cleaning solutions, food, cosmetics, grease, oil and plasticizers.

With the proper formulation of the thermoset polyurethane layer, the graphic article is particularly suited for use in outdoor environments. Such articles are exposed to a wide variety of harsh, deteriorative conditions such as environmental weathering, chemicals and abrasion. Polyurethane-based surface layers which comprise the reaction product of aliphatic isocyanates and either polyols are useful in this regard because of their ability to provide weathering, chemical and abrasion resistance while remaining flexible.

The following non-limiting examples further illustrate that present invention. Unless otherwise indicated, the following test procedures were used in the examples. The particular materials and amounts recited in these examples, as well as other conditions and details, are to be interpreted broadly in the art and should be construed to unduly restrict or limit the invention in any way.

The test methods listed hereinbelow may be used to evaluate the utility of multi-layered articles according to the invention in outdoor environments, especially in conjunction with motor vehicles. These tests are analogous to many which have been adopted or developed by major automobile manufacturers. However, an article which fails to pass every test may still be suitable for other uses depending on the requirements for a given application and the standards which have been established by a particular end user. Unless alternative criteria are noted below, an article is considered to have passed a particular test if it shows no objectionable effects including surface deterioration, excessive shrinkage, delamination, edge lifting, gloss or color change, adhesion loss, and cracking or crazing. The tests have long been used in the automotive industry to characterize exterior durability and observations should be consistent with those standards which have come to be recognized.

In each test, the graphic article includes a pressure sensitive adhesive (typically about 25 to 51 mm thick) for bonding a sample of the article to a test substrate. The nature of the test substrate (its material of construction, whether it is painted, primed, etc.) is typically specified by the end user of the article, although any test substrate specified by an automobile manufacturer may be used. Conventionally, the test substrates are about 30.5 cm×10.2 cm in size with the sample of the article being 8.9 cm×8.9 cm, except as noted below. Once the sample has been firmly applied to the test substrate, the resulting panel is preconditioned for 24 hours under ambient conditions (23° C. ±2° C., 50% ±55% relative humidity (R.H.)). All tests are performed under ambient conditions unless noted otherwise. Furthermore, all panels are subjected to a 24 hour ambient condition recovery period at the conclusion of the test and before recording observations.

The following non-limiting examples further illustrate the present invention. Unless otherwise indicated, the following test procedures were used in the examples. The particular materials and amounts recited in these examples, as well as other conditions and details, are to be interpreted broadly in the art and should be construed to unduly restrict or limit the invention in any way.

The test methods listed hereinbelow may be used to evaluate the utility of multi-layered articles according to the invention in outdoor environments, especially in conjunction with motor vehicles. These tests are analogous to many which have been adopted or developed by major automobile manufacturers. However, an article which fails to pass every test may still be suitable for other uses depending on the requirements for a given application and the standards which have been established by a particular end user. Unless alternative criteria are noted below, an article is considered to have passed a particular test if it shows no objectionable effects including surface deterioration, excessive shrinkage, delamination, edge lifting, gloss or color change, adhesion loss, and cracking or crazing. The tests have long been used in the automotive industry to characterize exterior durability and observations should be consistent with those standards which have come to be recognized.

In each test, the graphic article includes a pressure sensitive adhesive (typically about 25 to 51 mm thick) for bonding a sample of the article to a test substrate. The nature of the test substrate (its material of construction, whether it is painted, primed, etc.) is typically specified by the end user of the article, although any test substrate specified by an automobile manufacturer may be used. Conventionally, the test substrates are about 30.5 cm×10.2 cm in size with the sample of the article being 8.9 cm×8.9 cm, except as noted below. Once the sample has been firmly applied to the test substrate, the resulting panel is preconditioned for 24 hours under ambient conditions (23° C. ±2° C., 50% ±5% relative humidity (R.H.)). All tests are performed under ambient conditions unless noted otherwise. Furthermore, all panels are subjected to a 24 hour ambient condition recovery period at the conclusion of the test and before recording observations.

Test Methods

FTIR Determination of Free Isocyanate

The amount of available isocyanate was determined using a Nicolet 510 FT-IR spectrometer according to the manufacturer's instructions. The spectrometer measures the amounts of initial isocyanate ($[NCO]_i$), which corresponds to the peak size of the isocyanate absorption band at 2260 $cm^{-1}$ on an uncured film (Peak Size$_{2260})_i$, and the residual isocyanate ($[NCO]_r$), determined by the comparable peak size of a cured or partially cured polyurethane film (Peak $Size_{2260})_r$. The weight per cent of available isocyanate (%) after curing or partially curing is represented as follows:

$$\% = (([NCO]_r)/([NCO]_i)) \times 100 = [(\text{Peak } Size_{2260})_r/(\text{Peak } Size_{2260})_i] \times 100$$

Surface Layer Adhesion; Color Layer Adhesion

Surface layer adhesion and color layer adhesion may be evaluated according to the same test procedure. A series of 11 parallel lines each 1 millimeter (mm) apart is scored on the surface of the color layer or the surface layer, as the case may be. A second series of 11 parallel lines, each 1 mm apart and perpendicular to the first set is scored to create a grid of 100 squares each measuring about 1 mm 1 mm. Each scored line is sufficiently deep to fully penetrate the layer without cutting into the underlying layer. Scotch brand tape #610 (Minnesota Mining and Manufacturing, St. Paul, Minn.) is firmly adhered to the grid and then removed in a rapid, single, continuous motion by pulling at an angle of 90° relative to the panel. Percent adhesion was measured as the proportion of squares of the original 100 that remained. Preferably the adhesion is at least 90% to pass the test. Preferably the adhesion is 95%, an more preferably it is 100%.

Heat Aging

Panels are exposed for 7 days at 80°±2° C. in an air-circulating oven. There shall be no significant gloss loss or color change from the surface layer or color layer.

Moisture Resistance

A panel is exposed for 7 days at 38°±2° C. and 99±1% R.H. No delamination between the color layer and the surface layer should occur (referred to below as "surface layer delamaination"). There should also be no visible delamination between the adhesive layer and the layer of the graphic article to which it is adhered (referred to below as "adhesive layer delamination"). There should also be no visible blistering, permanent stain or change of color or gloss.

Abrasion Resistance

Resistance to abrasion (or abrasion resistance) as those terms are used herein may be evaluated by subjecting the graphic article to a Teledyne Taber Abraser (Teledyne, Inc.) fitted with a CS-17 abrading wheel carrying a load of 500 grams per head in accordance with SAE J1847. Preferably, the graphic article does not exhibit any wear-thru to the test substrate after 1,000 cycles.

10 Day Water Immersion

A panel is immersed in 31.5° C. water for 10 days. No delamination between the color layer and the surface layer should occur (referred to below as "surface layer delamination"). There should also be no visible delamination between the adhesive layer and the layer of the graphic article to which it is adhered (referred to below as "adhesive layer delamination"). There should also be no visible blistering, permanent stain or change of color or gloss.

Salt Spray

Resistance to a harsh salt spray is determined by spraying a panel with a 0.1% salt solution at 35° C. for 7 days. No delamination between the color layer and the surface layer should occur (referred to below as "surface layer delamination"). There should also be no delamination between the adhesive layer and the layer of the graphic article to which it is adhered, no blistering, no permanent stain or no change of color or gloss.

Elongation at Break

Elongation is the amount of film stretch measured at the point of film break. The test procedure is detailed in ASTM D882, method A. The size of test specimen is 25 mm wide and 125 mm long and the jaw separation is 100 mm. The test speed is 50 mm/minute. At least three test specimen should be run. The elongation at break point is recorded in percentage.

Chip Resistance:

Resistance to gravel is tested according to SAE J400 at −30° C.

TABLE 1

Materials Used in Examples

| Materials | Description | Supplier |
|---|---|---|
| Tone(TM)-201 | Polyester diol | Union Carbide, Danbury, CT |
| Triton(TM) GR-7M | Di-2-ethylhexyl sodium sulfosuccinate | Union Carbide, Danbury, CT |
| Metacure(TM) T-12 | Dibutyl tin dilaurate | Air products and Chemicals Inc, Allentown, NJ |
| Silwet(TM)-7607 | Polyether oxide modified polydimethylsiloxane | Witco Chemicals, Tarrytown, NY |
| Byk(TM)-331 | Polyether oxide modified polydimethylsiloxane | Byk-Chemie USA, Wallingford, CT |
| Uvinul(TM) N-539 | 2-ethylhexyl 2-cyano-3,3-diphenylacrylate | Ciba Chemicals, Hawthorne, NY |
| Zapon(TM) black R liquid | Black colorant | BASF, North Mount Olive, NJ |
| Bayhydrol(TM)-121 | Water based polyurethane dispersion | Bayer Corp., Pittsburgh, PA |
| Tone(TM)-301 | Polyester Triol | Union Carbide, Danbury, CT |
| Byk(TM)-025 | Polysiloxane | Byk-Chemie USA, Wallingford, CT |
| CAB(TM) 381-0.1 | Cellulose acetate butyrate | Eastman Chem., Kingsport, TA |
| Zapon(TM) red liquid | Red colorant | BASF, North Mount Olive, NJ |
| Tinuvin(TM)-292 | Hindered amine | BASF, Parsippany, NJ |
| Formrez(TM)-55-225 | Polyester diol | Witco Chem., Tarrytown, NY |
| Desmodur(TM)-3390 | Polyisocyanate | Bayer Corp., Pittsburgh, PA |
| Neorez(TM)-9699 | Water based polyurethane dispersion | Zeneca Resin, Inc., Wilmington, MA |
| Joncryl(TM)-587 | Acrylic polyol | S.C. Johnson Polymers, Racine, WI |
| 2,4-Pentanedione | | Union Carbide, Danbury, CT |
| Formrez(TM)-55-112 | Polyester diol | Witco Chem., Tarrytown, NY |
| Troysan(TM) Polyphase AF-1 | Fungicide | Troy Chem., East Hanover, NJ |
| Desmodur(TM) XP-7100 | Polyisocyanate | Bayer Corp., Pittsburgh, PA |
| 3M 8900 series inks | | Minnesota Mining and Manufacturing, St. Paul, MN |
| Neocryl(TM) CX-100 | Polyaziridine X-linker | Zeneca Resin, Inc., Wilmington, MA |

TABLE 2

Compositions

| Materials | Comp A | Comp B | Comp C | Com D |
|---|---|---|---|---|
| Troysan Polyphase AF-1 | — | 0.3 | — | 0.2 |
| Joncryl-587 | 11.6 | — | 13.5 | — |
| Metacure T-12 | 0.005 | — | 0.005 | — |
| Neorez-9699 | — | — | — | 100 |
| PM-acetate | 50 | — | 65 | — |
| 2,4-Pentandione | 0.9 | — | 1.0 | — |
| Butyl acetate | 11.5 | — | 13.5 | — |
| Byk-025 | — | 0.2 | — | 0.2 |

TABLE 2-continued

| | Compositions | | | |
|---|---|---|---|---|
| Materials | Comp A | Comp B | Comp C | Com D |
| Triton GR-7M | — | 0.2 | — | 0.3 |
| Xylene | 50 | — | 65 | — |
| Desmodur-3390 | 33.5 | — | 33 | — |
| Byk-331 | — | 0.1 | — | 0.1 |
| CAB 380-0.1 | 3.6 | — | 4.2 | — |
| Bayhydrol-121 | — | 100 | — | — |
| Tone-201 | 15.6 | — | 18.2 | — |
| Methyl isobutyl ketone | 11.6 | — | 13.5 | — |
| Tinuvin-292 | 2.8 | 1.3 | 2.8 | 1.3 |
| Uvinul N-539 | 4.8 | 1.6 | 4.4 | 1.6 |
| PS-556 | 10.4 | — | — | — |
| Neocryl CX-100 | — | 3.0 | — | 3.0 |
| Butyl carbitol | — | 8.0 | — | 16.0 |

EXAMPLE 1

Materials for Composition C (Comp C) in Table 2 were thoroughly mixed together to form a uniform solution. The solution was then coated, using a notch bar coater, to a thickness of about 76 micrometers on a release coated (silicone) polyester film. The coated composition was dried and partially cured for 2 minutes in an oven at 85° C., 2 minutes in an oven at 121° C., and 2 minutes in an oven at 130° C. to form a dry film having a thickness of about 15 micrometers. The amount of free isocyanate groups left in the partially cured film was 63.7% by weight as determined according to the test method described above. Composition B (Comp B in Table 2) was coated over the partially cured film of Comp C with a notch bar coater to a wet thickness of about 101 micrometers. The coated composition was dried according the conditions for Composition C above to obtain a dried film thickness of about 20 micrometers. The resulting composite film was visibly clear and the two layers bonded very well to each other and passed the Surface Layer Adhesion Test. The two layer film had an elongation at break 112.7%.

An FTIR transmittance spectra was run on the two-layered film, which was substantially fully cured, from both sides of the film, i.e., from the side of Composition C (50 on FIG. 5) and from the side of Composition B (60 on FIG. 6). The peaks located at 1690 cm$^{-1}$ and 1730 cm$^{-1}$ in the spectrum are where the carbonyl groups in the urethane linkages appear. The peak size of the free carbonyl groups located at 1730 cm$^{-1}$ was noticeably larger than the hydrogen-bonded carbonyl groups located at 1690 cm$^{-1}$, showing that the amount of free carbonyl groups is greater than the amount of hydrogen-bonded carbonyl groups. Likewise, the spectra run on the Composition B side of the film 60 on FIG. 6 shows a more pronounced difference between the peaks at 1730 cm$^{-1}$ and 1690 cm$^{-1}$ with the free carbonyl peak being larger.

It is believed that less hydrogen bonded carbonyl groups between the polymer chains of the film of this example makes the film more flexible with greater elongation than the film of Comparative Example 1.

COMPARATIVE EXAMPLE C1

Composition B (Comp B in Table 2) was coated onto a release coated polyester film using a notch bar coater to a thickness of about 101 micrometers. The composition was cured for 2 minutes in an oven at 85° C., 2 minutes in an oven at 121° C., and 2 minutes in an oven at 130° C., to obtain a dried film having a thickness of about 20 micrometers. Composition C was then coated over the dried film to a thickness of about 76 micrometers wet to obtain a dry thickness of about 15 micrometers. The composition was cured for 5 minutes in an oven at 85° C., 10 minutes in an oven at 121° C., and 30 minutes in an oven at 130° C. to form a two-layered film. The film had an elongation at break of 6.8%.

The resulting clear two layered film was tested by FTIR on both sides of the film as described in Example 1. The transmittance spectra 52 on FIG. 5, tested on the side of Composition C, and and 62 on FIG. 6, tested from the side of Composition B, both show smaller peaks at 1730 cm$^{-1}$ indicating a lower amount of free carbonyl groups and larger peaks at 1690 cm$^{-1}$ indicating more hydrogen bonded carbonyl groups.

EXAMPLE 2

A two layered clear film was prepared according to the procedure of Example 1 except that after partially curing Composition C, the partially cured film was further cured at 25° C. for 4 days before Composition B was coated and cured on top of it. The weight percent of available isocyanate prior to coating Composition B was 34.6%. The film passed the Surface Adhesion Test.

EXAMPLE 3

A two layered clear film was prepared according to the procedure of Example 2 except that the partially cured film of Composition C was further cured at 25° C. for 8 days instead of 4. The weight percent of available isocyanate prior to coating Composition B was 23.4%. The film passed the Surface Adhesion Test.

EXAMPLE 4

Control

Example 4 was prepared according to the procedure of Example 1 except that the coated Composition C was dried and cured for 5 minutes in an oven at 85° C., 10 minutes in an oven at 121° C., and 30 minutes in an oven at 130° C. FTIR results showed that there was substantially no free isocyanate left in the cured film. Then Composition B was coated over Composition C and cured according to the procedure described in Example 1. The film did not pass the adhesion test with most of the squares of Composition B pulling away from Composition C.

Examples 1–4 illustrate the importance of having residual isocyanate groups on the thermosettable polyurethane layer prior to coating the second layer in promoting adhesion between the two layers.

EXAMPLE 5

A two part composition was prepared by mixing the materials in Composition A (Comp A in Table 2) except the polyisocyanate (Desmodur-3390) using an air mixer with a propeller blade until well dispersed. Immediately before coating the polyisocyanate was added and mixed well. The composition was coated according to the procedure described in Example 1. The coated composition was partially cured for 1.5 minutes in an oven at 79° C., 1.5 minutes in an oven at 107° C., and 1.5 minutes in an oven at 125° C. to form a clear film. Composition B (Comp B in Table 2) was coated over the partially cured film using the procedure of Example 1 except that it was cured at the temperatures described for Composition C in this example to form a fully cured 2-layered film. A reverse image was printed on top of cured Composition B using powder printing inks. The image exhibited excellent adhesion to Composition B. The image layer was then laminated to an acrylic pressure-sensitive adhesive layer which was then laminated to a 508 micrometer thick sheet of brown colored ABS (acrylonitrile butadiene styrene) to form a composite film. The release coated polyester film was then removed. The multi-layer construction was vacuum thermoformed in a mold to form a three dimensional article having a thickness range from about 6 mm to about 10 mm with a sharp corner and edge. The vacuum thermoforming was achieved with about 25 seconds dwell time at about 235° C., and the edge and corner maintained the sharp definition of the mold.

EXAMPLE 6

A clear two-layer film was prepared according to the procedure of Example 5. A reverse image was printed onto cured Composition B using 3M™ 8900 series gravure inks, and dried 1.5 minutes in a 79° C. oven, 1.5 minutes in a 93° C. oven and 1.5 minutes in a 121° C. oven. The gravure inks showed excellent adhesion to Composition B. The image layer was laminated to an acrylic adhesive layer which was then laminated to a 508 micrometer thick sheet of brown colored ABS to form a composite film. The release coated polyester film was removed and multi-layer composite was thermoformed at the same conditions as described in Example 5. The resulting formed article had the sharp corner and edge definition of the mold.

EXAMPLE 7

An imaged composite film was prepared according to the procedure of Example 5. The release coated polyester film was removed and the film was placed in a pre-heated vacuum mold with cured Composition A against the mold. The mold temperature was set at 60° C. The composite film was then vacuum thermoformed and drawn into a three dimensional shape having a sharp corner and edge, and a thickness of about 3.0 mm, which was the depth of the mold. A casting resin composition (Comp E in Table 3) was poured into the molded film contacting the image layer and an acrylic foam tape was placed on top of the casting resin. The mold was maintained at 60° C. and the article was left in the mold until the casting resin cured.

Several molded articles were prepared and a separate article was tested for each test described above: Heat Aging, Moisture Resistance, Salt Spray, and Water Immersion. All of the articles passed the test to which they were subjected according to the above-described criteria.

TABLE 3

| Casting Resin Compositions | | | |
|---|---|---|---|
| Material | Comp E | Comp F | Comp G |
| Silwet L-7607 | 0.3 | 0.3 | 0.3 |
| Metacure T-12 | 0.14 | 0.14 | 0.14 |
| Formrez-55-225 | 31.9 | 31.9 | 31.9 |
| Tinuvin-292 | 1.0 | 1.0 | 1.0 |
| Tone-301 | 30.0 | 30.0 | 30.0 |
| Uvinul N539 | 1.0 | 1.0 | 1.0 |
| Formrez-55-112 | 30.0 | 30.0 | 30.0 |
| Zapon Black R Liquid | — | — | 1.0 |
| Zapon Red Liquid | — | 12.0 | — |
| Total | 100.0 | 100.0 | 100.0 |
| Desmodur XP-7100 | 100.0 | 100.0 | 100.0 |

EXAMPLE 8

A two-layer clear film was prepared vacuum thermoformed according to the method described in Example 7. A red pigmented casting resin (Comp F in Table 3) was poured into the mold in contact with the cured Composition B. A tin metallized polyester film (3M™QV-1000 polyester film available from Minnesota Mining and Manufacturing, St. Paul, Minn.) was laminated with the metal layer to the cast resin and cured in the mold which was maintained at 60° C. to produce three dimensional articles. The articles were tested for Heat Aging, Moisture Resistance, Salt Spray, and Water Immersion as described above and in Example 7. All of the articles passed the test to which they were subjected.

EXAMPLE 9

Three dimensional articles were made according to the procedure described in Example 9 except that Comp C was used in place of Comp A in making the two-layer film. The articles were tested for Heat Aging, Moisture Resistance, Salt Spray, and Water Immersion as described above and in Example 7. All of the articles passed the test to which they were subjected.

EXAMPLE 10

Three dimensional articles were prepared according to the procedure described in Example 9 except that Comp D was used instead of Comp B in the two layer film. After thermoforming, Comp E was poured into the molded shell so that it was in contact with Comp D. A tin metallized polyester film was laminated to Comp D before curing. The articles were tested for Heat Aging, Moisture Resistance, Salt Spray, and Water Immersion as described above and in Example 7. All of the articles passed the test to which they were subjected.

EXAMPLES 11 AND 12

In Example 11, a two-layer film was prepared according to the procedure of Example 5. In Example 12, a two-layer film was prepared according to the procedure of Example 5 except that Composition C (Comp C) was used instead of Comp A.

Both films were formed into three-dimensional articles according to the method of Example 7 except that the mold used had a depth of 1.6 mm and the resulting article was 1.6 mm thick. A black pigmented casting resin (Comp G in Table 3) the molded film so that it was in contact with the cured Comp B in each instance. A 3M™ Scotchcal™ black PVC film (Minnesota Mining and Manufacturing, St. Paul, Minn.) was laminated to the polyurethane casting resin before curing. The articles were tested for Heat Aging, Moisture Resistance, Salt Spray, and Water Immersion as described above and in Example 7. All of the articles passed the test to which they were subjected.

EXAMPLE 13

A two-layer film was prepared according to the procedure of Example 1. An acrylic pressure-sensitive adhesive composition was coated over cured Comp B, and cured 70° C. for 2 minutes, 95° C. for 2 minutes, and 125° C. for 2 minutes. The thickness of dried adhesive was about 25.4 micrometers. The adhesive coated side was then thermally laminated to a graphic having an ink image on white 3M™ Scotchcal™ PVC film (Minnesota Mining and Manufacturing, St. Paul, Minn.). The lamination was performed at a nip roll temperature of 125° C. at about 1.8 meters/minute. The nip roll pressure was set at 345 kilopascals. The resulting graphic film was tested independently for Heat Aging, Moisture Resistance, Salt Spray, and Water Immersion as described above and in Example 7, and also for Chip Resistance and Abrasion Resistance according to above described test procedures. All of the films passed the test to which they were subjected.

EXAMPLE 14

A two-layer film was prepared according to the procedure of Example 3 The dual clear film prepared in Example 1. The cured Comp B side of the film was thermally laminated to a 300 micrometer thick extruded polyether-based thermoplastic polyurethane sheet to form a composite sheet. The laminating rolls were set at 129° C.; the nip roll pressure was about 207 kilopascals and the laminating speed was 1.8 meters/minute. The resulting sheet was independently tested in each of the tests described in Example 13. All of the films passed the test to which they were subjected.

EXAMPLE 15

A two-layer film was prepared according to the procedure of Example 9. Then black 3M™ Scotchcal™ PVC (Minnesota Mining and Manufacturing, St. Paul, Minn.) organosol was coated to a wet thickness of about 114 micrometers to obtain a dry thickness of about 51 micrometers. The organosol was dried for 2 minutes in an oven set at 74° C. oven, 2 minutes in an oven set at 107° C., 2 minutes in an oven set at 135° C. and 2 minutes in an oven set at 185° C. The film composite passed the Surface Adhesion Test. Films were independently tested for Heat Aging, Moisture Resistance, Salt Spray, Water Immersion, and Abrasion Resistance. All of the films passed the test to which they were subjected.

The black film was then thermoformed into three dimensional articles according to the procedure described in Example 7. The formed parts were then independently tested as described above for the film. All of the parts passed the test to which they were subjected.

The foregoing examples illustrate the ability of the multilayered films of the invention to be vacuum thermoformed. Additionally, the films as well as the formed articles of the invention exhibit excellent resistance to humidity, water, heat, salt water, abrasion, and chipping.

What is claimed is:

1. A multi-layered article, comprising a first layer of a thermoset polyurethane, a second layer of a polymeric composition bonded to said first layer, said second layer of a polymeric composition applied onto said first layer in a polymeric or pre-polymeric state having carboxyl groups and a cross-linking agent, and wherein said first layer has available isocyanate groups prior to applying said second layer, the cross-linking agent reacted with the available isocyanate groups of said first layer and with the carboxyl groups of said second layer.

2. A multi-layered article as recited in claim 1, wherein said first layer is partially cured.

3. A multi-layered article as recited in claim 1, wherein the available isocyanate groups comprise at least 5% by weight of the total weight of said first layer as indicated by FTIR test for determination of free isocyanate.

4. A multi-layered article as recited in claim 1, wherein said first layer has an NCO to OH ratio within the range of about 0.75 to about 1.25.

5. A multi-layered article as recited in claim 1, wherein said article exhibits an elongation test result of at least 15% at a temperature of 25° C.

6. A multi-layered article as recited in claim 1, wherein said thermoset polyurethane is a reaction product of one or more hydroxyl components, and at least one isocyanate compound.

7. A multi-layered article as recited in claim 6, wherein said one or more hydroxyl components is selected from polyester compositions, polyacrylic compositions, polyether compositions, polycarbonate compositions, polyalkylene compositions, carbinol terminated polydimethylsiloxane or mixtures thereof.

8. A multi-layered article as recited in claim 6, wherein said isocyante compound is a primary isocyanate, a secondary isocyanate, a tertiary isocyanate, or mixtures thereof.

9. A multi-layered article as recited in claim 1, wherein said second layer of a polymeric composition is selected from polyurethanes, polyurethane/acrylic copolymers, copolymers or terpolymers of polyalkylene, polyalkyl diene, polyacrylate ester, polyalkyl ester, polyvinyl ester, or polyvinyl with acrylic acid or methacylic acid, polyethylene acrylic acid copolymer, polyethylene methacrylic acid copolymer, polyethylene acrylic methacrylic acid terpolymer, methylmethacrylate-acrylic acid copolymer, polybutadiene methacrylic acid copolymer, vinylchloride-acrylic acid copolymer, and mixtures thereof.

10. A multi-layered article as recited in claim 1, wherein said cross-linking agent is selected from polyfunctional aziridines, multifunctional carbodiimides, multifunctional epoxies, melamine resins, and combinations thereof.

11. A multi-layered article as recited in claim 1, wherein said multi-layered article is thermoformable.

12. A multi-layered article as recited in claim 11, wherein said multi-layered article is thermoformed at a temperature of 100° C. or less.

13. A multi-layered article as recited in claim 1, wherein said first layer or said second layer includes leveling agents, UV absorbers, moisture scavengers, antioxidants, antifoaming agents, coloring agents, decorative solids, or combinations thereof.

14. A multi-layered article comprising, comprising a first layer of a thermoset polyurethane produced from a primary isocyanate, a second layer of a polymeric composition bonded to said first layer, wherein said first and second layer of said multi-layered article each exhibit a urethane linkage under FTIR test results at 25° C., said urethane linkage exhibiting a hydrogen bonded carbonyl peak equal to or smaller than a free carbonyl peak.

15. A multi-layered article as recited in claim 14, wherein said primary isocyanate includes at least one polyisocyanate.

16. A multi-layered article as recited in claim 14, wherein said thermoset polyurethane is the reaction product of one or more polyols, one or more diols and said primary isocyanate.

17. A multi-layered article as recited in claim 14, wherein said article exhibits an elongation test result of at least 15% at a temperature of 25° C.

18. A multi-layered article as recited in claim 14, wherein said second layer of a polymeric composition is selected from polyurethanes, polyurethane/acrylic copolymers, copolymers or terpolymers of polyalkylene, polyalkyl diene, polyacrylate ester, polyalkyl ester, polyvinyl ester, or polyvinyl with acrylic acid or methacylic acid, polyethylene acrylic acid copolymer, polyethylene methacrylic acid copolymer, polyethylene acrylic methacrylic acid terpolymer, methylmethacrylate-acrylic acid copolymer, polybutadiene methacrylic acid copolymer, vinylchloride-acrylic acid copolymer, and mixtures thereof.

19. A multi-layered article as recited in claim 14, wherein said multi-layered article is thermoformable.

20. A multi-layered article as recited in claim 19, wherein said multi-layered article is thermoformed at a temperature of 100° C. or less.

21. A multi-layered article as recited in claim 14, wherein said first layer or said second layer includes leveling agents, UV absorbers, moisture scavengers, antioxidants, antifoaming agents, coloring agents, decorative solids, or combinations thereof.

22. A method for making the multi-layered article of claim 1, comprising bonding a layer of a polymeric composition or pre-polymeric composition, said polymeric composition or pre-polymeric composition having carboxyl groups and a cross-linking agent, to a layer of a thermosettable polyurethane having available isocyanate groups.

23. A method as recited in claim 22, wherein said layer of thermosettable polyurethane is partially cured.

24. A method as recited in claim 22, wherein said available isocyanate groups comprise at least 5% by weight as indicated by FTIR test for determination of free isocyanate.

25. A method as recited in claim 22, wherein said first layer has an NCO to OH ratio within the range of about 0.75 to about 1.25.

26. A method as recited in claim 22, wherein said resulting multi-layered article exhibits an elongation test result of at least 15% at a temperature of 25° C.

27. A method for forming a multi-layered article, comprising
   (a) providing a layer of a thermosettable polyurethane having available isocyanate groups;
   (b) bonding a layer of a polymeric composition or a pre-polymeric composition to said layer of thermosettable polyurethane, wherein said polymeric has carboxyl groups and a cross-linking agent; and
   (c) curing said thermosettable polyurethane,
wherein the cross-linking agent reacts with the available isocyanate groups of the thermosettable polyurethane and with the carboxyl groups of the polymeric composition or pre-polymeric composition.

28. A method as recited in claim 27, wherein said layer of thermosettable polyurethane is partially cured.

29. A method as recited in claim 27, wherein said available isocyanate groups comprise at least 5% by weight as indicated by FTIR test for determination of free isocyanate.

30. A method as recited in claim 27, wherein said first layer has an NCO to OH ratio within the range of about 0.75 to about 1.25.

31. A method as recited in claim 27, wherein said resulting multi-layered article exhibits an elongation test result of at least 15% at a temperature of 25° C.

\* \* \* \* \*

UNITED STATES PATENT AND TRADEMARK OFFICE
CERTIFICATE OF CORRECTION

PATENT NO. : 6,607,831 B2
DATED : August 19, 2003
INVENTOR(S) : Ho, Charlie C.

It is certified that error appears in the above-identified patent and that said Letters Patent is hereby corrected as shown below:

Title page,
Item [*] Notice, delete "0 days", insert -- 7 days --.

Column 1,
Line 19, after "it", insert -- is --,

Column 4,
Line 32, delete "Philadelpjia", insert therefore -- Philadelphia --,

Column 11,
Line 13, after "invention", insert -- can --,

Column 14,
Line 2, delete "specimen", insert therefore -- specimens --,

Signed and Sealed this

Twentieth Day of April, 2004

JON W. DUDAS
*Acting Director of the United States Patent and Trademark Office*